US006807565B1

(12) United States Patent
Dodrill et al.

(10) Patent No.: US 6,807,565 B1
(45) Date of Patent: Oct. 19, 2004

(54) INSTANT MESSAGING SYSTEM USING VOICE ENABLED WEB BASED APPLICATION SERVER

(75) Inventors: Lewis Dean Dodrill, Richmond, VA (US); Ryan Alan Danner, Glen Allen, VA (US); Susan Harrow Barban, Midlothian, VA (US)

(73) Assignee: Cisco Technology, Inc., San Jose, CA (US)

( * ) Notice: Subject to any disclaimer, the term of this patent is extended or adjusted under 35 U.S.C. 154(b) by 985 days.

(21) Appl. No.: 09/604,655

(22) Filed: Jun. 27, 2000

Related U.S. Application Data

(60) Provisional application No. 60/152,316, filed on Sep. 3, 1999.

(51) Int. Cl.[7] ............................................. G06F 13/00
(52) U.S. Cl. ...................... 709/206; 709/219; 709/227; 379/88.17; 379/88.18; 719/329
(58) Field of Search ................................ 370/259, 352, 370/353, 389, 400, 401, 493; 379/67.1, 68, 88.04, 88.17, 88.18; 704/201; 709/204, 206, 217, 219, 224, 227, 238; 719/328, 329

(56) References Cited

U.S. PATENT DOCUMENTS

| | | | |
|---|---|---|---|
| 4,837,798 A | | 6/1989 | Cohen et al. |
| 5,568,540 A | * | 10/1996 | Greco et al. ............. 379/88.25 |
| 6,226,668 B1 | * | 5/2001 | Silverman .................. 709/204 |
| 6,233,318 B1 | * | 5/2001 | Picard et al. ............ 379/88.17 |
| 6,424,647 B1 | * | 7/2002 | Ng et al. ..................... 370/352 |
| 6,430,604 B1 | * | 8/2002 | Ogle et al. .................. 709/207 |
| 6,484,196 B1 | * | 11/2002 | Maurille ...................... 709/206 |
| 6,532,286 B1 | * | 3/2003 | Burg ...................... 379/209.01 |
| 6,535,896 B2 | * | 3/2003 | Britton et al. .............. 715/523 |
| 6,546,005 B1 | * | 4/2003 | Berkley et al. ............. 370/353 |
| 6,549,612 B2 | * | 4/2003 | Gifford et al. ............. 379/67.1 |
| 6,747,970 B1 | * | 6/2004 | Lamb et al. ................ 370/352 |

OTHER PUBLICATIONS

BOS, "XML in 10 Points", W3.org (Aug. 26, 1999).
U.S. patent application Ser. No. 09/480,485 filed Jan. 11, 2000.

* cited by examiner

*Primary Examiner*—Viet D. Vu
(74) *Attorney, Agent, or Firm*—Leon R. Turkevich

(57) ABSTRACT

An application server receives an HTTP request for execution of an instant messaging application operation for a sending party. A selected extensible markup language (XML) document is accessed in response to reception of the HTML request. A first HTML page is generated based on the XML document for recording a voice message by the sending party. A registry is accessed to determine whether a receiving party is available to receive the voice message. A second HTML page is generated for the receiving party having instructions for playing the voice message for the receiving party. Hence instant messaging services may be deployed on a platform that is customizable, scalable, and built upon open standards such as Internet protocol. By preserving multiple sessions, parties involved in instant messaging can suspend their present session or activity for a moment to create a new session to exchange audio messages and when finished, can instantly resume the suspended session.

38 Claims, 5 Drawing Sheets

INSTANT MESSAGING SYSTEM USING VOICE ENABLED WEB BASED APPLICATION SERVER

CROSS REFERENCE TO RELATED APPLICATIONS

This application claims priority from provisional application No. 60/152,316, filed Sep. 3, 1999, the disclosure of which is incorporated in its entirety herein by reference.

BACKGROUND OF THE INVENTION

1. Field of the Invention

The present invention relates to generating and executing voice enabled web applications within a hypertext markup language (HTML) and hypertext transport protocol (HTTP) framework.

2. Description of Related Art

The evolution of the public switched telephone network has resulted in a variety of voice applications and services that can be provided to individual subscribers and business subscribers. Such services include voice messaging systems that enable landline or wireless subscribers to record, playback, and forward voice mail messages. However, the ability to provide enhanced services to subscribers of the public switched telephone network is directly affected by the limitations of the public switched telephone network. In particular, the public switched telephone network operates according to a protocol that is specifically designed for the transport of voice signals; hence any modifications necessary to provide enhanced services can only be done by switch vendors that have sufficient know-how of the existing public switched telephone network infrastructure.

An open standards-based Internet protocol (IP) network, such as the World Wide Web, the Internet, or a corporate intranet, provides client-server type application services for clients by enabling the clients to request application services from remote servers using standardized protocols, for example hypertext transport protocol (HTTP). The web server application environment can include web server software, such as Apache, implemented on a computer system attached to the IP network. Web-based applications are composed of HTML pages, logic, and database functions. In addition, the web server may provide logging and monitoring capabilities.

In contrast to the public switched telephone network, the open standards-based IP network has enabled the proliferation of web based applications written by web application developers using ever increasing web development tools. Hence, the ever increasing popularity of web applications and web development tools provides substantial resources for application developers to develop robust web applications in a relatively short time and an economical manner. However, one important distinction between telephony-based applications and web-based applications is that telephony-based applications are state aware, whereas web-based applications are stateless.

In particular, telephony applications are state aware to ensure that prescribed operations between the telephony application servers and the user telephony devices occur in a prescribed sequence. For example, operations such as call processing operations, voicemail operations, call forwarding, etc., require that specific actions occur in a specific sequence to enable the multiple components of the public switched telephone network to complete the prescribed operations.

The web-based applications running in the IP network, however, are state-less and transient in nature, and do not maintain application state because application state requires an interactive communication between the browser and back-end database servers accessed by the browsers via a HTTP-based web server. However, an HTTP server provides asynchronous execution of HTML applications, where the web applications in response to reception of a specific request in the form of a URL from a client, instantiate a program configured for execution of the specific request, send an HTML web page back to the client, and terminate the program instance that executed the specific request. Storage of application state information in the form of a"cookie" is not practical because some users prefer not to enable cookies on their browser, and because the passing of a large amount of state information as would normally be required for voice-type applications between the browser and the web application would substantially reduce the bandwidth available for the client.

Commonly-assigned, copending application Ser. No. 09/480,485, filed Jan. 11, 2000, entitled Application Server Configured for Dynamically Generating Web Pages for Voice Enabled Web Applications the disclosure of which is incorporated in its entirety herein by reference, discloses an application server that executes a voice-enabled web application by runtime execution of extensible markup language (XML) documents that define the voice-enabled web application to be executed. The application server includes a runtime environment that establishes an efficient, high-speed connection to a web server. The application server, in response to receiving a user request from a user, accesses a selected XML page that defines at least a part of the voice application to be executed for the user. The XML page may describe any one of a user interface such as dynamic generation of a menu of options or a prompt for a password, an application logic operation, or a function capability such as generating a function call to an external resource. The application server then parses the XML page, and executes the operation described by the XML page, for example dynamically generating an HTML page having voice application control content, or fetching another XML page to continue application processing. In addition, the application server may access an XML page that stores application state information, enabling the application server to be state-aware relative to the user interaction. Hence, the XML page, which can be written using a conventional editor or word processor, defines the application to be executed by the application server within the runtime environment, enabling voice enabled web applications to be generated and executed without the necessity of programming language environments.

Hence, web programmers can write voice-enabled web applications, using the teachings of the above-incorporated application Ser. No. 09/480,485, by writing XML pages that specify respective voice application operations to be performed. The XML documents have a distinct feature of having tags that allow a web browser (or other software) to identify information as being a specific kind or type of information. Hence, the XML documents define the application to be executed by the application server within the runtime environment, enabling voice enabled web applications to be generated and executed without the necessity of programming language environments.

Web-based instant messaging applications have gained popularity since the applications provide a user immediate notification of a message from another party. More particularly, if a user is online and is running an instant messaging application, the user is registered with a server that tracks user sessions and activity. When the user sends a message to another party, the message is immediately apparent to the other party if the other party is online and a subscriber to the messaging service. If the other party is not online, the message is queued and can be retrieved at a later time. In this way, a user can respond if and when the user pleases, but the user has immediate knowledge of the other party's response. This type of communication is useful but limited, since all parties who wish to communicate with instant messages must be registered with the server using a proprietary application and must use a computer to employ the application to send and receive instant messages.

SUMMARY OF THE INVENTION

There is a need for an arrangement that enables users to deploy a scalable, open standards based instant messaging system on an open standards based network such as an Internet Protocol (IP) network.

These and other needs are attained by the present invention, where an application server, configured for executing a messaging application defined by XML documents, provides an application runtime environment configured for dynamically generating, in response to a HTTP request, a first hypertext markup language (HTML) document for recording a voice message by a sending party. The application runtime environment is configured for determining whether the receiving party is available to receive the voice message. The application runtime environment selectively generates a second HTML page having instructions to interrupt a present voice application session of the receiving party for playing the voice message, based on the determined availability, for the receiving party.

Another aspect of the present invention provides a method in an application server for executing a messaging application. The method includes receiving an HTTP request for execution of an instant messaging application operation for a sending party. A selected extensible markup language (XML) document is accessed in response to reception of the HTML request. A first HTML page is generated based on the XML document for recording a voice message by the sending party. A registry is accessed to determine whether a receiving party is available to receive the voice message. A second HTML page is generated for the receiving party having instructions for playing the voice message for the receiving party.

Hence voice-based instant messaging services may be deployed on a platform that is customizable, scalable, and built upon open standards such as Internet protocol. By preserving multiple sessions, parties involved in instant messaging can suspend their present session or activity for a moment to create a new session to exchange audio messages and when finished, can instantly resume the suspended session.

Additional advantages and novel features of the invention will be set forth in part in the description which follows and in part will become apparent to those skilled in the art upon examination of the following or may be learned by practice of the invention. The advantages of the present invention may be realized and attained by means of instrumentalities and combinations particularly pointed out in the appended claims.

BRIEF DESCRIPTION OF THE DRAWINGS

Reference is made to the attached drawings, wherein elements having the same reference numeral designations represent like elements throughout and wherein.

BEST MODE FOR CARRYING OUT THE INVENTION

Figure 1:
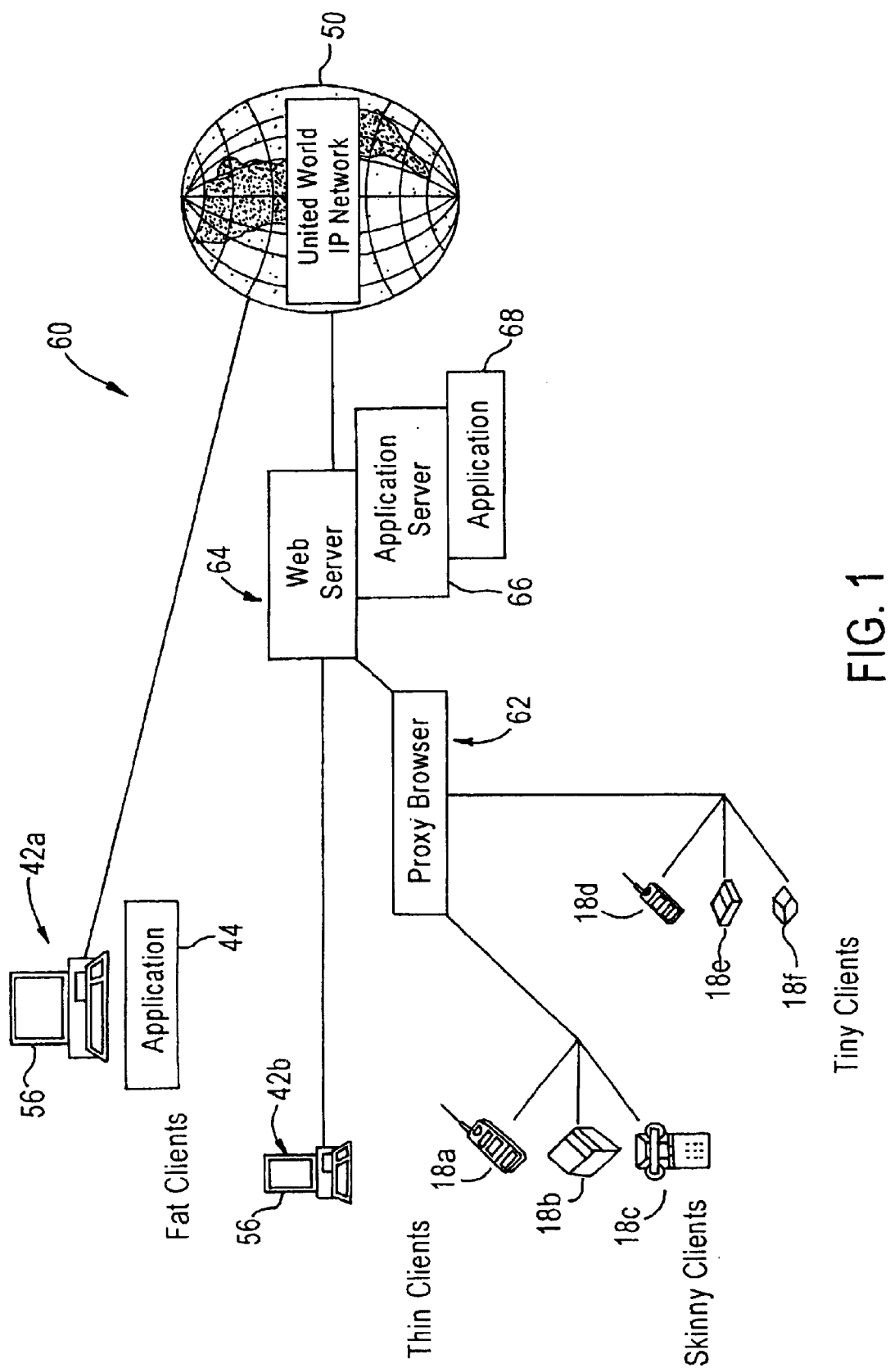
FIG. 1 is a block diagram illustrating an system enabling deployment of an instant messaging system, capable of executing voice enabled web applications, according to an embodiment of the present invention.
Figure 3:
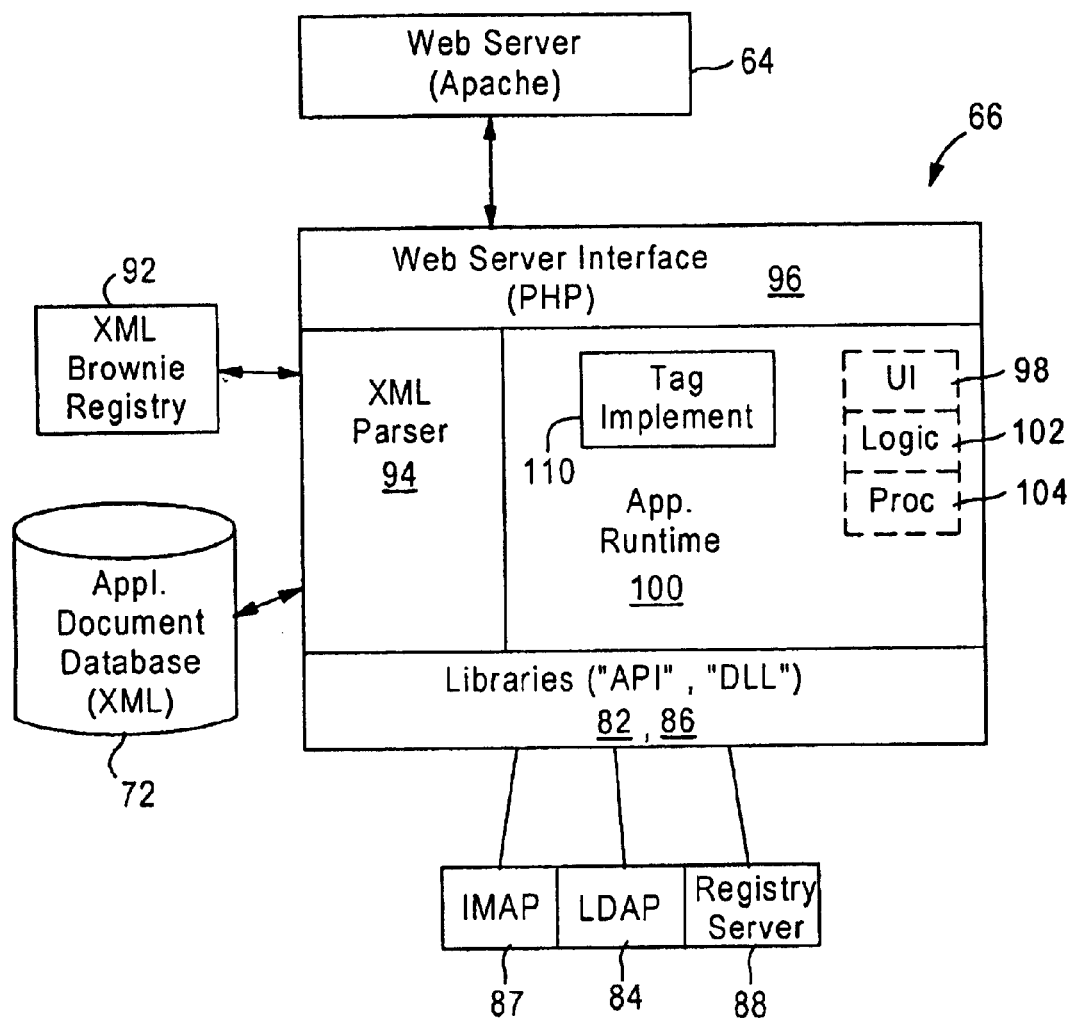
FIG. 3 is a diagram illustrating in detail an application server of FIGS. 1 and 2 according to an embodiment of the present invention.

FIG. 1 is a block diagram illustrating an architecture that provides instant voice messaging services and data services via an IP network using browser audio control according to an embodiment of the present invention, reproduced from FIG. 3 of the above-incorporated application Ser. No. 09/480,485. The clients 42a and 42b, referred to herein as "fat clients" and "thin clients", respectively, have the distinct advantage that they can initiate requests using IP protocol to any connected web server 64 to execute part or most of the applications 44 on behalf of the clients. An example of a fat client 42a is an e-mail application on a PC that knows how to run the application 44 and knows how to run the IP protocols to communicate directly with the messaging server via the packet switched network 50. An example of a thin client 42b is a PC that has a web browser; in this case, the web browser 56 can use IP protocols such as HTTP to receive and display web pages generated according to hypertext markup language (HTML) from server locations based on uniform resource locators (URLs) input by the user of the PC.

As shown in FIG. 1, each of the clients (tiny clients, skinny clients, thin clients and fat clients) are able to communicate via a single, unified architecture 60 that enables voice communications services between different clients, regardless of whether the client actually has browser capabilities. Hence, the fat client 42a and the thin client 42b are able to execute voice enabled web applications without any hardware modification or any modification to the actual browser; rather, the browsers 56 in the clients 42a and 42b merely are provided with an executable voice resource configured for providing browser audio control, described below.

The user devices 18a, 18b, and 18c, illustrated as a cordless telephone 18a, a fax machine 18b having an attached telephone, and an analog telephone 18c, are referred to herein as "skinny clients", defined as devices that are able to interface with a user to provide voice and/or data services (e.g., via a modem) but cannot perform any control of the associated access subnetwork.

The wireless user devices 18d, 18e, and 18f, illustrated as a cellular telephone (e.g., AMPS, TDMA, or CDMA) 18d, a handheld computing device (e.g., a 3-Com Palm Computing or Windows CE-based handheld device) 18e, and a pager 18f, are referred to as tiny clients. "Tiny clients" are distinguishable from skinny clients in that the tiny clients tend to have even less functionality in providing input and output interaction with a user, rely exclusively on the executable application in an access subnetwork to initiate communications; in addition, tiny clients may not be able to send or receive audio signals such as voice signals at all.

Hence, the skinny clients 18a, 18b, and 18c and the tiny clients 18d, 18e, and 18f access the voice messaging services in the unified network 60 via a proxy browser 62, configured for providing an IP and HTTP interface for the skinny clients and the tiny clients. In particular, browsers operate by interpreting tags within a web page supplied via an HTTP connection, and presenting to a user media content information (e.g., text, graphics, streaming video, sound, etc.) based on the browser capabilities; if a browser is unable to interpret a tag, for example because the browser does not have the appropriate executable plug-in resource, then the browser typically will ignore the unknown tag. Hence, the proxy browser 62 can provide to each of the skinny clients and tiny clients the appropriate media content based on the capabilities of the corresponding client, such that the cordless telephone 18a and telephone 18c would receive analog audio signals played by the proxy browser 62 and no text information (unless a display is available); the fax machine 18b and pager 18f would only receive data/text information, and the cellular telephone 18d and the handheld computing device 18e would receive both voice and data information. Hence, the proxy browser 62 interfaces between the IP network and the respective local access devices for the skinny clients and the tiny clients to provide access to the messaging network 60.

Figure 2:
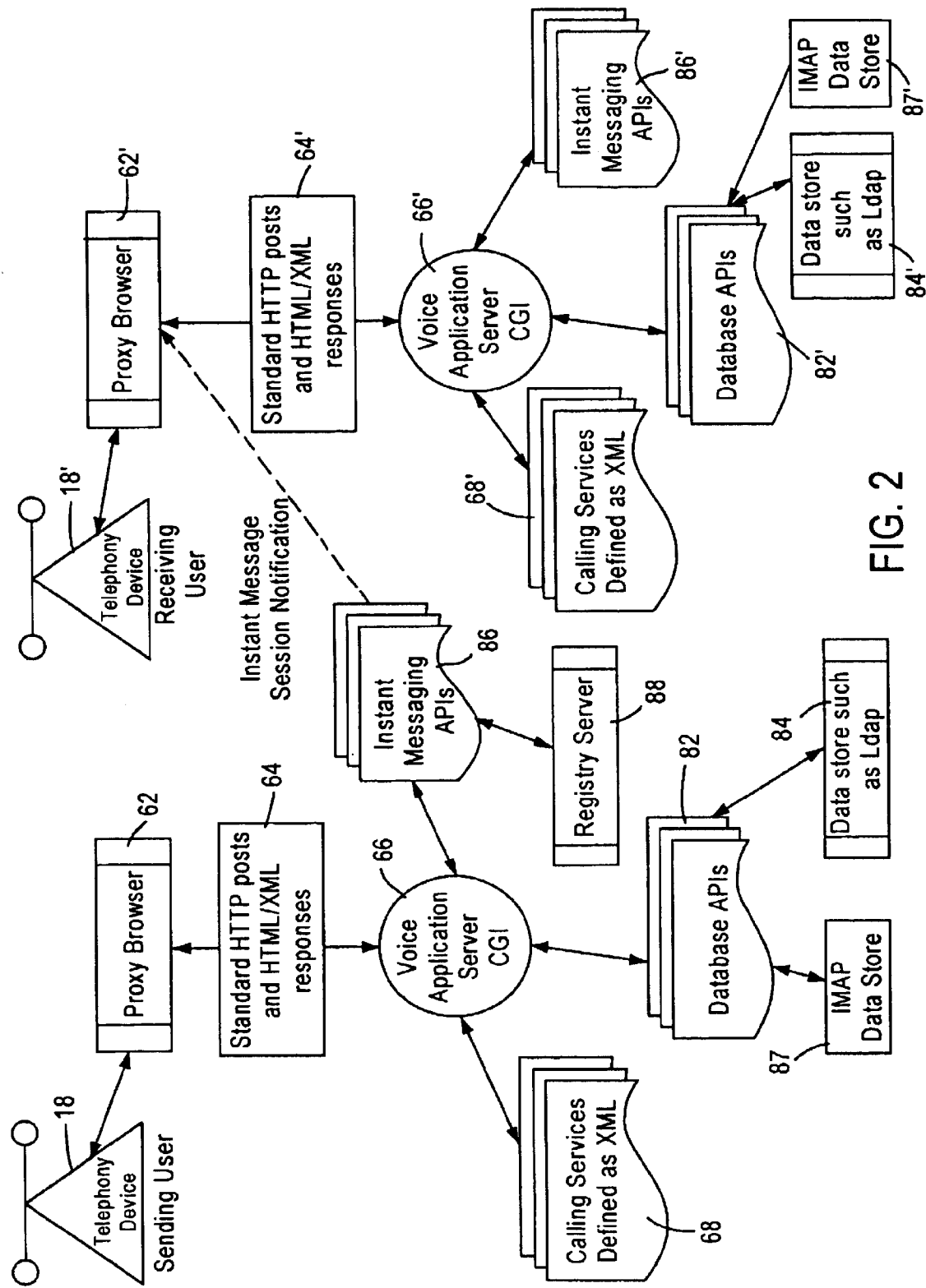
FIG. 2 is a diagram illustrating interactions by application servers of FIG. 1 with resources via an IP network for execution of voice instant messaging services according to an embodiment of the present invention.

The proxy browser 62 and the web browsers 56 within the fat client 42a and the thin client 42b execute voice enabled web applications by sending data and requests to a web server 64, and receiving hypertext markup language (HTML) web pages from the web server 64, according to hypertext transport protocol (HTTP). The web server 64 serves as an interface between the browsers and an application server 66 that provides an executable runtime environment for XML voice applications 68. For example, the web server 64 may access the application server 66 across a common gateway interface (CGI) as illustrated in FIG. 2, by issuing a function call across an application programming interface (API), or by requesting a published XML document or an audio file requested by one of the browsers 56 or 62. The application server 66, in response to receiving a request from the web server 64, may either supply the requested information in the form of an HTML page having XML tags for audio control by a voice resource within the browser, or may perform processing and return a calculated value to enable the browser 56 or 62 to perform additional processing.

The application server 66 accesses selected stored XML application pages 68 (i.e., XML pages that define an application) and in response generates new HTML pages having XML tags during runtime and supplies the generated HTML pages having XML tags to the web server 64. Since multiple transactions may need to occur between the browser 56 or 62 and the application server 66, the application server 66 is configured for storing for each existing user session a data record, referred to as a "brownie", that identifies the state of the existing user session; hence, the application server 66 can instantiate a procedure, return the necessary data, and terminate the procedure without the necessity of maintaining the instance running throughout the entire user session.

Hence, the application server 66 executes voice application operations from a stored XML document based on a transient application state, where the application server 66 terminates the application instance after outputting the generated XML media information to the browser 18 or 42.

FIG. 2 is a diagram illustrating in further detail the instant messaging application executed by the voice application server 66 according to an embodiment of the present invention. As described above with respect to FIG. 1, the application server 66 receives via the web server 64 HTTP requests from either a PC-based web browser 42 capable of supporting full media content (e.g., audio, text, images, and streaming video), or as shown in FIG. 2, a proxy browser 62 configured for serving as an HTTP interface for a user input device, such as a telephone 18, having limited media capabilities (e.g., audio only). In response to receiving the HTTP requests, the voice application server 66 accesses a selected XML document 68 based on parameters specified within the HTTP request (e.g., commands specified within the URL), and based on application state determined from accessing a brownie, assuming the HTTP request specifies a valid session identifier. As described below, the application runtime environment within the voice application server 66 parses the XML tags within the accessed XML document 68, and dynamically generates an HTML page having XML tags that specify media content (e.g., .wav files) and control information for playing the media files by a proxy browser.

The voice application server 66 is configured for accessing database application programming interfaces (API's) 82 to external resources based on prescribed procedures that may be called during parsing of an XML tags in a selected XML document 68. As described below, the application server 66 issues function calls to APIs 82 for accessing the external resources for prescribed operations, enabling the deployment of a robust, scalable instant messaging system having messaging operations distributed across multiple platforms. In particular, the application server 66 accesses subscriber profile information from an IP-based database server 84 according to LDAP protocol.

The voice application server 66 is configured for accessing a registry server 88 through instant messaging APIs 86. The registry server 88 is configured to keep track of users who are currently active or capable of receiving instant messages, as will be explained in more detail below.

FIG. 3 is a diagram illustrating in detail the application server 66 according to an embodiment of the present invention. The application server 66 is implemented as a server executing a PHP hypertext processor with XML parsing and processing capabilities, available open source on the Internet at http://www.php.net. As shown in FIG. 3, the server 66 includes an XML parser 94 configured for parsing the application-defining XML documents 68 stored in the XML document database 72, or the XML documents (i.e., "brownies") stored in the registry 92 and configured for specifying the state and attributes for respective user sessions. The application server 66 also includes a high speed interface 96 that establishes a high-speed connection between the application server 66 and the web server 64. For example, the PHP hypertext processor includes a high-speed interface for Apache Web servers.

The application server 66 also includes a runtime environment 100 for execution of the parsed XML documents. As described above, the runtime environment 100 may selectively execute any one of user interface operation 98, a logic operation 102, or a procedure call 104 as specified by the parsed XML document by executing a corresponding set of executable functions based on the rule set for the corresponding operation. In particular, the application runtime environment 100 includes a tag implementation module 110 that implements the XML tags parsed by the XML parser 94. The tag implementation module 110 performs relatively low-level operations, for example dynamically generating an XML menu page using executable functions specified by a menu rule set in response to detecting a menu tag, performing a logical operation using executable functions specified by a logic rule set in response to a decision tag, or fetching an audio (.wav) file in response to detecting a sound tag. Hence, the tag implementation module 110 implements the tag operations that are specified within the XML framework of the stored XML documents.

The application server 66 also includes a set of libraries 82 and 86 that may be implemented as dynamically linked libraries (DLLs) or application programming interface (API) libraries. The libraries 82, 86 enable the runtime environment 100 to implement the procedures 104 as specified by the appropriate XML document. The application server 66 may issue a function call to one of a plurality of EP protocol compliant remote resources 84, 87, or 88. For example, the PHP hypertext processor includes executable routines capable of accessing the LDAP data store 84 or an IMAP data store 87. The data store 84 can include user information for instant messaging such as the identities and telephone numbers of persons that the user wishes to communicate with, and a list of persons and telephone numbers which the user wishes to block from instant messaging applications. The IMAP data store 87 is used to store messages. Note that the mechanisms for accessing the services 84, 87 and 88 should be established within the application server before use of XML documents that reference those services. Once the services 84, 87 and 88 are established, the application runtime environment 100 can perform a function operation by using executable functions specified by a function call rule set.

The arrangement for executing instant messaging application operations will now be described.

With reference to FIG. 2, a voice application server 66' permits a receiving party to participate in instant messaging with the sending party via web server 64', proxy browser 62', telephone 18'. Instant messaging APIs 86', database APIs 82', data store 84' and XML documents 68' are accessed by the voice application server 66' in a manner similar to application server 66 serving the sending party.

Figure 4A:
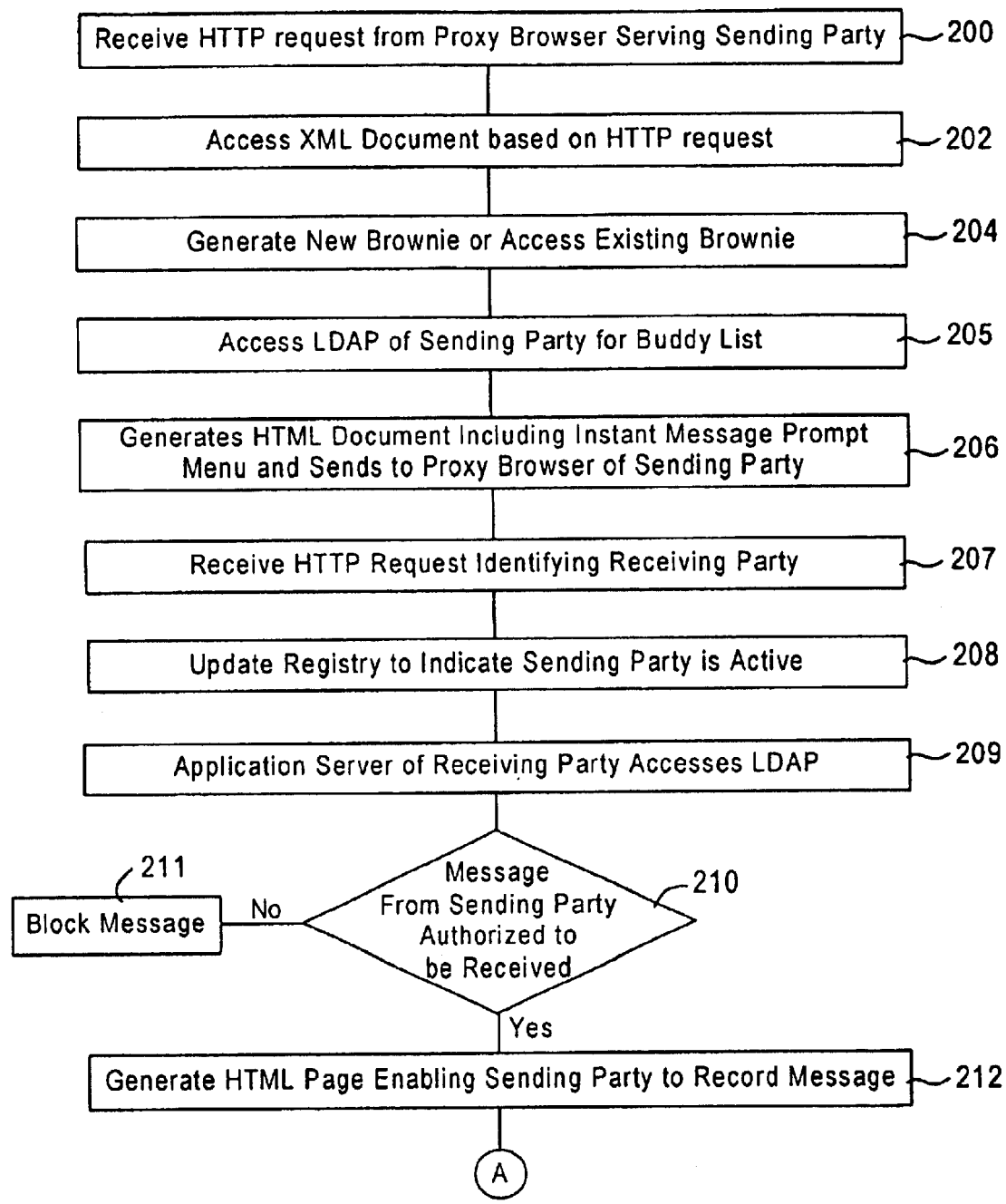
FIG. 4 is a diagram illustrating the execution of instant messaging system operations according to an embodiment of the present invention.
Figure 4B:
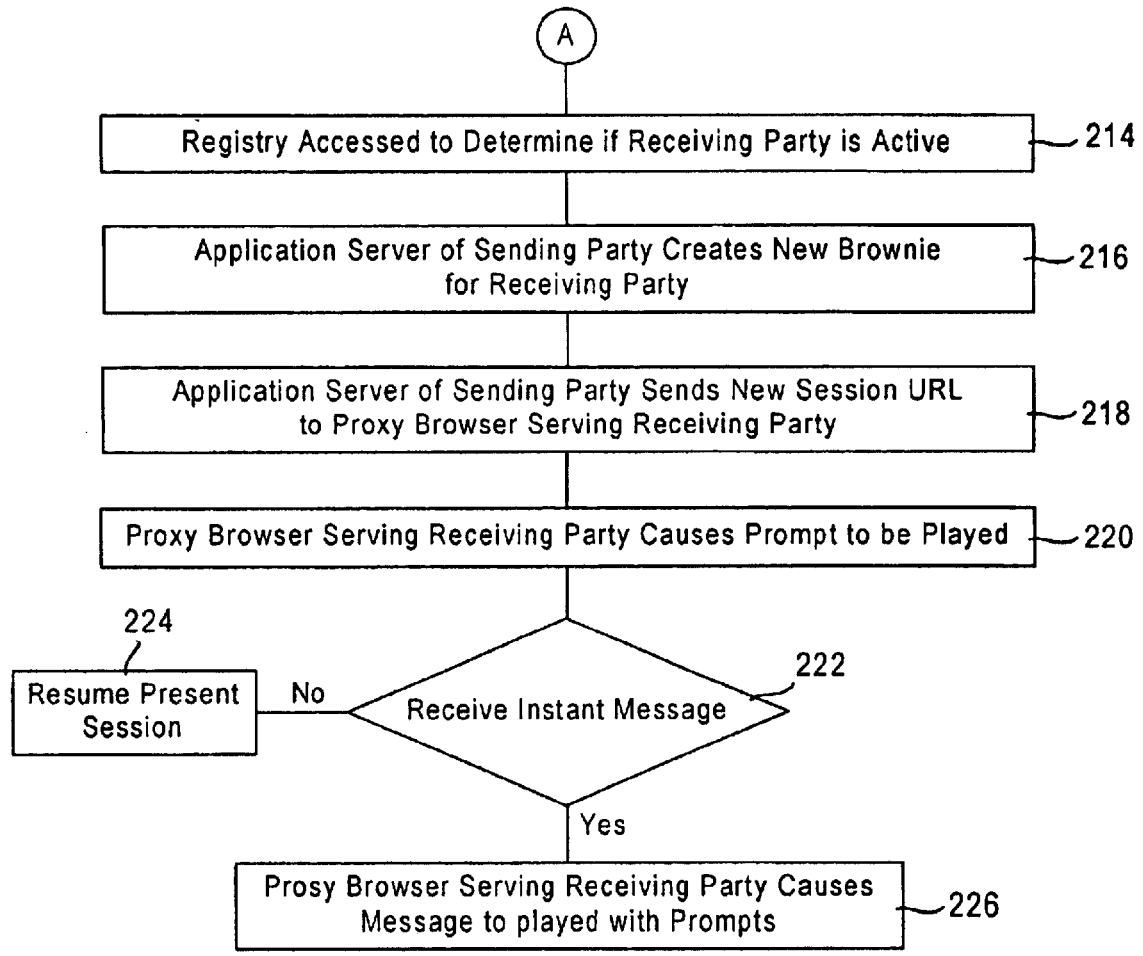

FIG. 4 illustrates sending an instant message to a receiving party according to an embodiment of the present invention. The steps described in FIG. 4 can be implemented as executable code stored on a computer readable medium (e.g., a hard disk drive, a floppy drive, a random access memory, a read only memory, an EPROM, a compact disc, etc.).

As shown in FIG. 4, the application server 66 receives in step 200 an HTTP request from the proxy browser 62 for initiation of a session enabling a sending party to send an instant voice message. The application server 66 responds to the HTTP request in step 202 by accessing a selected XML document 68 from the document database 72 that specifies the application operations for generating an HTML document that includes an audible prompt menu for sending an instant message. The application server 66 also generates a new brownie in step 204 if the sending party is initiating a session with the application server 66, else accesses an existing brownie from the registry 92 based on a valid session identifier specified within the HTTP URL request, accesses, in step 205, the data store 84 of the sending party to obtain the sending party's profile including his or her "buddy list", and sends the generated HTML document including the instant message prompt menu to the browser 62 in step 206. The browser serving sending party sends a HTTP request to the application server 66 identifying the receiving party in step 207.

The application server 66 then accesses the registry server 88 in step 208 to update the registry to indicate that the sending party is now active for instant messaging by storing the sending party's identity and the session identifier that identifies the corresponding brownie. The registry server 88 can employ a SQL database or have an XML format. The application server 66 also accesses the data store 84' of the receiving party in step 209 to determine in step 210 if the receiving party has authorized the receipt of messages from the sending party. If the receiving party has not authorized receipt of a message from the sending party, messaging is blocked in step 211. If authorization is given, the application server 66 in step 212 generates an HTML page enabling the sending party to record a voice message for the receiving party.

The application server 66 accesses the registry server 88 in step 214 to determine if receiving party is active for instant messaging. If the receiving party is active (currently in a session with application server 66' via telephone 18'), the application server 66 serving the sending party obtains the existing session identifier for the receiving party, generates in step 216 a new brownie having a new session identifier for a new session for the receiving party, and writes the new session identifier in the existing brownie. The session identifiers are cross-referenced in the existing brownie and the new brownie (e.g., new session ID stored in existing brownie and existing session ID stored in new brownie) to enable the voice application server 66' to "interrupt", in a controllable manner, the existing session with the new session providing the instant message. The application server 66 generates another HTML page which includes a URL having instructions for obtaining the voice message of the new session, including the new session identifier. This HTML page is sent to the proxy browser 62' of the receiving party in step 218. In step 220, the proxy browser 62' automatically posts the URL to the application server 66' which responds to the URL by placing the existing brownie on "hold" and accessing the new brownie for generation of a new HTML page; the new HTML page causes a prompt to be played for the receiving party such as, "Hello, you have an instant message from Mary Smith. Press 1 to listen connect, press 2 to save the message, or press 3 to resume your present session." If the receiving party inputs 3 in step 222, the application server 66' detects the new brownie, reactivates the brownie on "hold" and resumes the present session in step 224. If 2 is inputted, the message is stored the message in the IMAP store 87 of the receiving party so that the receiving party may listen to the message at a later time. If 1 is inputted in step 226, the instant message is played with prompts such as, "To respond to the message press 1, to connect with the sending party press 2". If the receiving party now inputs 1, the receiving party can respond to the instant message by creating his or her own instant message or may choose to speak with the sending party, in which case the receiving party inputs 2 and the call is bridged (via voice over IP).

It can be appreciated that instead of having the application server 66' place the existing brownie on hold and access the new brownie, the proxy browser 62' alone can manage the "hold" function. For example, the proxy browser 62' can be configured to distinguish between active and inactive HTML pages and chase the active page.

Thus, the proxy browser 62' listens for unsolicited notification from authorized sources with additional information being sent to the proxy browser 62' to accommodate real-time interruptions. Additional details regarding execution of XML documents by the application server 66 are disclosed in the above-incorporated application Ser. No. 09/480,485.

Hence, according to the disclosed embodiment, instant messaging services may be deployed on a platform that is customizable, scalable, and built upon open standards such as Internet protocol. By preserving multiple sessions, parties involved in instant messaging can suspend their present session or activity for a moment to create a new session to exchange audio messages and when finished, can instantly resume the suspended session.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. A method in an application server for executing an instant messaging application, the method comprising:
   receiving an HTTP request for execution of an instant messaging application operation for a sending party;
   accessing a selected extensible markup language (XML) document in response to reception of the HTML request;
   generating a first HTML page based on the accessed XML document, for recording a voice message by the sending party;
   accessing a registry to determine whether a receiving party is available to receive the voice message; and
   generating, for the receiving party, a second HTML page having instructions for playing the voice message for the receiving party.

2. The method of claim 1, wherein the second HTML page includes a prompt enabling the receiving party to respond to the voice message.

3. The method of claim 1, further including updating the registry to indicate that the sending party is active for instant voice messaging operations.

4. The method of claim 1, wherein the step of generating the second HTML page includes inserting a first audio tag including a .wav file of the voice message and a second media tag configured for controlling playing of the .wav file.

5. The method of claim 1, further including storing the voice message in a data store of the receiving party.

6. The method of claim 5, wherein storing of the voice message is performed in accordance with IMAP protocol.

7. The method of claim 1, wherein the step of generating the second HTML page includes generating a URL for obtaining the voice message.

8. The method of claim 7, further comprising generating a new session identifier that specifies a new application session for the receiving party, wherein the URL includes the new session identifier for interrupting a present session of the receiving party with the new application session.

9. The method of claim 1, further including accessing attribute information of the receiving party to determine whether the receiving party authorizes receipt of the voice message from the sending party.

10. The method of claim 9, wherein the attribute accessing step includes accessing a database server according to LDAP protocol.

11. An application server configured for executing an instant messaging application, the application server including:
   an application runtime environment configured for dynamically generating, in response to a HTTP request, a first hypertext markup language (HTML) document for recording a voice message by a sending party, the application runtime environment being configured for determining whether the receiving party is available to receive the voice message, the application runtime environment selectively generating a second HTML page having instructions to interrupt a present voice application session of the receiving party for playing the voice message, based on the determined availability, for the receiving party.

12. The application server of claim 11, further comprising a registry configured for identifying whether a user is available for instant messaging operations, the application runtime environment accessing the registry to determine whether the receiving party is active.

13. The application server of claim 11, wherein the second HTML page includes a prompt enabling the receiving party to respond to the voice message.

14. The application server of claim 13, wherein the application runtime environment is configured to update the registry to indicate that the sending party is active for instant voice messaging operations.

15. The application server of claim 11, wherein the second HTML page includes a first audio tag including a .wav file of the instant voice message and a second media tag configured for controlling playing of the .wav file.

16. The application server of claim 11, wherein application runtime environment is configured to generating, as part of the second HTML page, a URL for obtaining the voice message.

17. The application server of claim 16, wherein the application runtime environment is configured for generating a new application session identifier that specifies a new application session for the receiving party and wherein the URL includes the new session identifier for interrupting a present session of the receiving party with the new application session.

18. The application server of claim 11, wherein the application runtime environment is configured to access attribute information of the receiving party to determine whether the receiving party authorizes receipt of the voice message from the sending party.

19. The application server of claim 18, wherein the application runtime environment is configured to access a database server containing the attribute information according to LDAP protocol.

20. A computer readable medium having stored thereon sequences of instructions for executing an instant messaging application, the sequences of instructions including instructions for performing the steps of:
   receiving an HTTP request for execution of an instant messaging application operation for a sending party;
   accessing a selected extensible markup language (XML) document in response to reception of the HTML request;
   generating a first HTML page based on the accessed XML document, for recording a voice message by the sending party;
   accessing a registry to determine whether a receiving party is available to receive the voice message; and
   generating, for the receiving party, a second HTML page having instructions for playing the voice message for the receiving party.

21. The medium of claim 20, wherein the second HTML page includes a prompt enabling the receiving party to respond to the voice message.

22. The medium of claim 20, further including updating the registry to indicate that the sending party is active for instant voice messaging operations.

23. The medium of claim 20, wherein the step of generating the second HTML page includes inserting a first audio tag including a .wav file of the voice message and a second media tag configured for controlling playing of the .wav file.

24. The medium of claim 20, further including storing the voice message in a data store of the receiving party.

25. The medium of claim 24, wherein storing of the voice message is performed in accordance with IMAP protocol.

26. The medium of claim 20, wherein the step of generating the second HTML page includes generating a URL for obtaining the voice message.

27. The medium of claim 26, further comprising generating a new session identifier that specifies a new application session for the receiving party, wherein the URL includes the new session identifier for interrupting a present session of the receiving party with the new application session.

28. The medium of claim 20, further including accessing attribute information of the receiving party to determine whether the receiving party authorizes receipt of the voice message from the sending party.

29. The medium of claim 28, wherein the attribute accessing step includes accessing a database server according to LDAP protocol.

30. An application server configured for executing a messaging application, the application server including:

a hypertext transport protocol (HTTP) interface for receiving an HTTP request specifying execution of a prescribed messaging application operation for a subscriber; and means for dynamically generating, in response to the HTTP request, a first hypertext markup language (HTML) document for recording a voice message by a sending party and, when the receiving party is determined to be active to receive the instant voice message, generating a second HTML page having instructions to interrupt a present voice application and for playing the voice message for the receiving party.

31. The application server of claim 30, further comprising a registry configured to be updated to identify whether a user is active for instant messaging operations, the generating means accessing the registry to determine whether the receiving party is active.

32. The application server of claim 30, wherein the second HTML page includes a prompt enabling the receiving party to respond to the voice message.

33. The application server of claim 31, wherein the generating means is configured to update the registry to indicate that the sending party is active for instant voice messaging operations.

34. The application server of claim 30, wherein the second HTML page includes a first audio tag including a .wav file of the instant voice message and a second media tag configured for controlling playing of the .wav file.

35. The application server of claim 30, wherein generating means is configured to generating, as part of the second HTML page, a URL for obtaining the voice message.

36. The application server of claim 35, wherein the generating means is configured for generating a new application session identifier that specifies a new application session for the receiving party and wherein the URL includes the new session identifier for interrupting a present session of the receiving party with the new application session.

37. The application server of claim 20, wherein the generating means is configured to access attribute information of the receiving party to determine whether the receiving party authorizes receipt of the voice message from the sending party.

38. The application server of claim 37, wherein the generating means is configured to access a database server containing the attribute information according to LDAP protocol.

* * * * *